March 3, 1942.  E. W. SCRIPTURE, JR  2,275,272
METHOD OF CURING CONCRETE
Filed Dec. 12, 1938
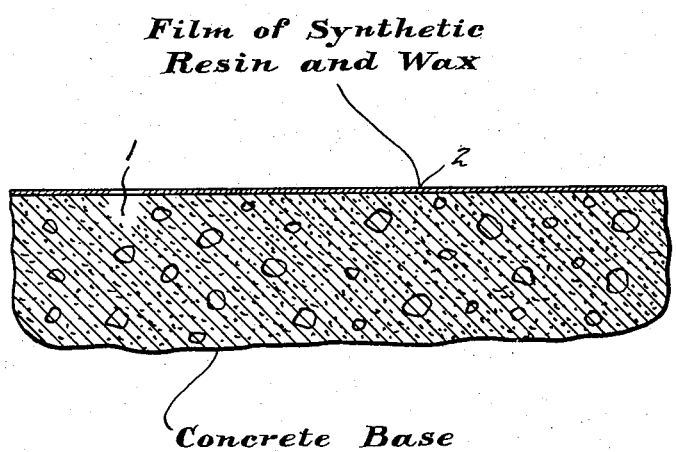
INVENTOR
*Edward W. Scripture Jr.*
BY
Evans + McCoy
ATTORNEYS Patented Mar. 3, 1942

2,275,272

UNITED STATES PATENT OFFICE 2,275,272

METHOD OF CURING CONCRETE

Edward W. Scripture, Jr., Shaker Heights, Ohio

Application December 12, 1938, Serial No. 245,211

5 Claims. (Cl. 25—154)

This invention relates to a process for curing and coating concrete, mortar and artificial stone. It has particular reference to a process of curing concrete floors, walks, piers, roadways and the like containing Portland or other hydraulic cements.

It is an object of the present invention to provide a simple and inexpensive process of curing concrete or mortar, which process prevents efflorescence, improves the appearance of and protects the surfaces of the concrete or mortar.

It is a well-known fact that for an hydraulic cement to attain its maximum strength, it is necessary that sufficient water be present in the concrete or mortar over a shorter or longer period of time to hydrate the silicate and aluminate compounds which make up the cement. It has heretofore been the practice to cure the concrete by spraying large quantities of water on the concrete or to coat it with paper, sawdust or an asphalt emulsion. The wetting and covering procedures have been unsatisfactory because the retention of water in the concrete is at best only partial and there is no wear-resistant coating on the surface of the concrete. The asphalt compositions have not been entirely satisfactory because of their color and relatively poor wear-resistance.

Colored concrete provides a means of producing a durable and inexpensive yet decorative surface. Colored concrete, however, is susceptible to many deleterious influences. Like all hydraulic cement compositions, colored concrete or mortar must be adequately cured with water. Defects are introduced by incompleteness of curing or by lack of uniformity in curing, by efflorescence during curing or drying out, by the accidental grinding of dirt into the surface, and by poor workmanship. The surface appearance of concrete or mortar is inherently dull and lifeless and its appearance may be considerably improved.

According to the process of this invention a composition can be applied easily to a wet cement surface before any material hardening action has taken place. The composition is of a type which effectively retains the moisture in the slab, thus insuring complete hydration and curing, prevents the formation of efflorescence on the surface, since the moisture carrying the soluble salts which form efflorescence is retained within the concrete, and forms a hard and durable film without substantially altering the appearance of the surface.

The coating and finishing of walls, blocks, bricks, floors, or other structures composed of, coated with, or containing calcareous materials such as cement, lime, plaster of Paris, mortar, concrete, grouting, etc. offers a number of difficulties with the usual materials employed for coating and finishing, since these latter are mostly attacked by lime and other alkalies to a larger or smaller degree. Taking cement, concrete, or lime mortar for example, the lime present (as well as other alkalies usually occurring together with the lime) attacks resin acids and fatty acids, as well as their glycerides (such as the linolein of linseed oil) forming lime soaps. On the one hand, this destroys the bond of the calcareous materials by the removal of lime, or the destruction of bonding compounds containing it, and on the other the formation of the lime soaps affects prejudicially the coating materials. It has been attempted to obviate this difficulty by the preliminary treatment of the surface or material by mineral acids, such as hydrochloric, or salts, such as sulphates of various bases to remove the free lime, but this, of course, destroys the bond of the calcareous material on the surface, or as far as the action of the acid or salt extends, and makes such surface more or less friable. It has also been attempted to obviate it by the use of free fatty or resinous acids with the idea of forming lime soaps, but this also affects the bond of the surface while the lime soaps do not prove in this case desirable components of the coating as they tend to oxidize and become friable and are hydrolytic.

Since concrete forms a rigid body which is not subject to great movement, either by expansion and contraction or by bending, it is unnecessary that a high degree of elasticity be imparted to coating films, such as is required in the formulation of the ordinary varnishes and paints. This property in paints and varnishes is usually secured by the use of drying oils, such as tung or linseed oil, but for application to wet or moist hydraulic cement surfaces these oils must be avoided, since they are saponified by the lime or other alkaline substances in solutions formed in the presence of hydraulic cements. It is, moreover, necessary to use coatings which are substantially immune to attack by alkali and which form tough, impermeable and transparent films without the incorporation of such plasticizing agents as drying oils.

In any form of concrete coating containing acid material for the purpose of neutralizing the alkalinity of concrete, as is the case with certain types of concrete primers the speed of neutralization has to be considered. If the acid component acts rapidly, neutralization may be effected before the coating has set and dried. If the action of the acid component is slow, neutralization and reaction may go on after setting and drying of the composition, thus causing rupturing of the coating and its ultimate destruction. The resin acids differ from the fatty acids in this respect. They are slower than the fatty acids in neutralizing activity, so slow in fact that under ordinary conditions a coating compound has opportunity to dry and harden before neutralizing reactions are fairly under way, and these reactions subsequently progress to the detriment of the coating.

The following brief comparisons may serve to explain the differences noted. The fats as glycerides form well characterized bodies. The resins are largely bodies resulting from condensation, are very fluctuating in composition and the nature of their compounds is not at all well established at the present time. The copals which are so extensively used in varnish making vary in composition very greatly.

It will be apparent that neither the vegetable oils composed of fatty acid glycerides nor the natural resins containing as they do considerable proportions of saponifiable material are suitable for the purposes of my invention. Some attempts have been made to overcome this difficulty with natural resins by removing from the resin the saponifiable matter before incorporating it in the coating composition. Particularly this has been the case with resins separated from jelutong of different qualities known in the trade, according to the source from which they are derived, as Palembang, Pontianak, Sarawak, and the like. Pontianak resin especially has been separated and treated for use as a coating material but the pontianak resin in and of itself, whether free of saponifiable matter or in its original condition, is not a very good coating material, being more or less friable and brittle.

The foregoing difficulties encountered in the use of drying oils and natural resins in coating compositions for cement surfaces may be overcome by the use of synthetic resins which form tough, impermeable and transparent films and which are themselves unsaponifiable and substantially immune to attack by alkali. Among such resins are those formed by the treatment of rubber with hydrogen chloride, metal chlorides, or halogens, particularly chlorine, and known in the trade, for example, as Tornesit and Fliolite. Tornesit is a resin produced by the chlorination of rubber to a high degree, and is manufactured by the Hercules Powder Co., and "Pliolite" is the cyclized or polymerized rubber produced by the action of chlorostannic acid and heat on rubber and is manufactured by The Goodyear Tire & Rubber Co. The halogens react directly with rubber, gutta-percha, or balata to form an interesting series of compounds possessing properties intermediate between those of rubber and the brittle natural resins. Highly chlorinated rubber, together with derivatives containing less chlorine, furnish a graduated series of products with elastic properties varying from that of the original rubber to one of a tough leatherlike resin. The halogenated bodies are chemically inactive and are more soluble than the original stock in various solvents. The solutions possess much lower viscosity than those of the original material. They do not burn. Somewhat similar compounds are formed by the action of the hydrogen halides on rubber and related materials. Other synthetic resins, such as the copolymers of vinyl chloride and vinyl acetate, known as Vinylite, have similar properties and are suitable for the purpose of my invention. It is sufficient that the synthetic resin employed be chemically inert and unsaponifiable, that it be soluble in a suitable solvent to form a solution of low viscosity, and that it form a tough and relatively impermeable film.

I have found, however, that films of improved properties, particularly with respect to their retention of water vapor, can be secured by incorporating in the resin solution a proportion of a wax or waxlike substance, such as paraffin, which is substantially unsaponifiable.

The solvents to be used must obviously be adapted to the particular synthetic resin to be dissolved. I prefer to make use, however, of the great penetrating powers of benzol, toluol, xylol, or similar aromatic hydrocarbons. Furthermore, I find that although a considerable proportion of mineral spirits may be used in making solutions of these resins, an excess of mineral spirits tends to cause the formation of a more permeable film and this is particularly true where the mineral spirits used is of the same or lower volatility than the aromatic solvent. Most of the synthetic resins employed are soluble in the above named solvents, but for the vinyl resin solvents of the ketone type are required. I find that the aromatic hydrocarbon solvents permit the formation of adherent, impermeable films even on wet surfaces and the ketone solvents, being more or less miscible with water behave similarly.

An example of a composition embodying my invention is:

| | | Per cent |
|---|---|---|
| Xylol _____ gal__ | 1 | |
| Rubber resin (Pliolite) _____ lb__ | ⅔ | 91.5 |
| Paraffin _____ oz__ | 1 | 8.5 |

The composition is prepared by dissolving the resin in the solvent with heating and adding the wax. In the above composition the xylol may be replaced with similar coal-tar solvents, such as toluol in whole or in part, or with petroleum solvents, such as naphtha, but I find that only a partial replacement is desirable in this case, since the film formed with an excessive proportion of naphtha is not as effective. Synthetic resins suitable for this purpose are such resins as Vinylite, chlorinated rubber, cyclized rubber and similar alkali-resistant resins. As waxes or waxlike substances I have found that paraffin or similar inert wax is suitable or waxlike substances, such as the chlorinated naphthalenes (Halowaxes).

In the practice of my invention the curing composition is applied to the surface of the concrete as soon after it has been placed as is practicable; that is, before the concrete has attained any substantial degree of hardness or has lost any substantial portion of the water used in placing it. In practice this is from four to twelve hours after the placing of the concrete for exposed surfaces and immediately on stripping the forms for surfaces placed against forms. The application may be made by brush or spray or other suitable means. After this first application the concrete requires no further attention and curing proceeds automatically. It is unnecessary to remove the curing coat at the end of the curing period; instead this coating will serve as a protecting and finishing coat for the concrete surfaces.

The effectiveness of a curing treatment such as has been described may be judged by the loss in weight of concrete slabs when exposed to the air with and without the treatment. The results of some of these tests compared with similar tests of untreated specimens stored in an atmosphere of 100% relative humidity are as follows:

| | Loss in weight of 7½" x 7½" x 1½" Slabs in grams | | | | |
|---|---|---|---|---|---|
| | 1 day | 3 days | 7 days | 12 days | 15 days |
| No treatment, in air | 62 | 79 | 87 | 91 | 93 |
| No treatment, in 100% RH | 5 | 6 | 4 | 2 | 2 |
| Treated, in air | 2 | 3 | 4 | 6 | 7 |

It will be seen that the untreated slabs in air lose a large proportion of the water originally present in the concrete in the first day and continue to lose water rapidly during the subsequent period. In 100% relative humidity a small loss takes place in the first day and continues for a few days thereafter, but in the later period some water is reabsorbed from the saturated atmosphere. With the curing treatment the losses in water are negligible throughout the period and up to 7 days are actually less than the losses of the slabs in 100% relative humidity. Obviously, no reabsorption of water from the air of low relative humidity is possible. That the curing action of this treatment is equal to curing in 100% relative humidity, that is, perfect curing, is shown by the results of abrasion tests on these slabs as follows:

```
                                         In. abrasion
No treatment, in air_____  0.0255
No treatment, in 100% R. H_____  0.0203
Treated, in air_____  0.0200
```

In the application of this invention to colored surfaces it is desirable to incorporate in the curing composition a small amount of pigment. The proportion of pigment incorporated in the composition should be such that sufficient color and hiding power will be imparted to the coating to cover the underlying surface and prevent streaks or other unevenness of color, but should not be so great that the viscosity of the coating composition will be substantially increased or so great that a thick film will be formed, as is the case with paints which carry high percentages of pigment. Suitable pigments for this purpose are the inorganic oxides of iron, chromium, manganese, etc. of appropriate color, and which are resistant to the action of alkalies, and also alkali-resistant pigment dyestuffs, such as toluidine toners, Hansa yellow, etc. Among the blue pigments, ultramarine and Monastral blue may be used. The pigment may be incorporated in the coating composition by means of a roll-mill, colloid mill, or other suitable milling apparatus.

It is also often desirable, particularly for colored floors, that the curing coat shall form a film which is waxlike in character. This has the advantages of permitting the film to be polished, of imparting greater resistance to wear under traffic, and of providing means of easy maintenance. For this purpose I have found that the incorporation of a larger proportion of wax or waxlike substance in the compositions for colored floors than are usually necessary or desirable in the transparent curing treatment may be desirable. For this purpose I may use a wax, such as paraffin, or a wax of higher melting point, or a waxlike substance, such as a halogenated naphthalene (Halowax), which is unsaponifiable and not attacked by alkali. This last has the advantage of forming a waxlike film which may be polished, but which is not slippery like a wax.

The following example illustrates the protecting and curing of a concrete structure, such as a floor 1 having its surface coated with a film 2 deposited in accordance with this invention.

A coating of the following composition is prepared:

```
Xylol _____gal__  1
Rubber resin (Pliolite) _____lb__  1
Halowax _____lb__  1½
Pigment _____oz__  10
```

In the practice of my invention the colored curing composition is applied to the surface of the colored concrete as soon after it has been placed as is practicable; that is, before the concrete has attained any substantial degree of hardness, but is sufficiently hard so that the surface will not marred by the application, and before it has lost any substantial portion of the water used in placing it. The application may be made by brushing or spraying, or other suitable means. After application of this curing treatment the concrete requires no further attention and curing proceeds automatically. It may be desirable to cover a floor with paper or other suitable covering, which need not be waterproof, in order to prevent the spilling of paint, plaster, or similar materials on the floor by other trades, although the coating itself will protect the surface and prevent such materials from adhering to the floor. After curing is completed, the curing coat need not be removed and no further treatment is necessary. The coating may be polished, if desired, but this is not necessary, or another coat of the composition may be applied as a further finish.

Many modifications may be made of my invention without departing from the spirit thereof, and it is intended that it be limited only by the prior art and the scope of the appended claims.

What I claim is:

1. In a process for curing concrete wherein the concrete is placed and allowed to harden, the step which comprises applying to the surface of the freshly placed wet concrete a non-aqueous solution in a volatile solvent of an unsaponifiable waxlike substance and a chlorine-containing resin selected from the group consisting of the copolymers of vinyl acetate and vinyl chloride, rubber hydrochloride, rubber chloride, and the reaction product of a metal chloride and rubber, and permitting the solvent to evaporate to form a film on said surface substantially impermeable to water, whereby the evaporation of water from the concrete is greatly retarded and a coating which permanently adheres to the surface of the concrete is formed.

2. In a process for curing concrete wherein the concrete is placed and allowed to harden, the step which comprises applying to the surface of the freshly placed wet concrete a non-aqueous solution in a volatile solvent of an unsaponifiable waxlike substance and rubber chloride, and permitting the solvent to evaporate to form a film on said surface substantially impermeable to water, whereby the evaporation of water from the concrete is greatly retarded and a coating which permanently adheres to the surface of the concrete is formed.

3. In a process for curing concrete wherein the concrete is placed and allowed to harden, the step which comprises applying to the surface of the freshly placed wet concrete a non-aqueous solution in a volatile solvent of paraffin and rubber chloride, and permitting the solvent to evaporate to form a film on said surface substantially impermeable to water, whereby the evaporation of water from the concrete is greatly retarded and a coating which permanently adheres to the surface of the concrete is formed.

4. In a process for curing concrete wherein the concrete is placed and allowed to harden, the step which comprises applying to the surface of the freshly placed wet concrete a non-aqueous solution in a volatile solvent of chlorinated naphthalene and rubber chloride, and permitting the solvent to evaporate to form a film on said surface substantially impermeable to water, whereby the evaporation of water from the concrete is greatly retarded and a coating which permanently adheres to the surface of the concrete is formed.

5. In a process for curing concrete wherein the concrete is placed and allowed to harden, the step which comprises applying to the surface of the freshly placed wet concrete a non-aqueous solution in a volatile solvent of an unsaponifiable waxlike substance and a copolymer of vinyl chloride and vinyl acetate, and permitting the solvent to evaporate to form a film on said surface substantially impermeable to water, whereby the evaporation of water from the concrete is greatly retarded and a coating which permanently adheres to the surface of the concrete is formed.

EDWARD W. SCRIPTURE, Jr.